US012458621B1

(12) United States Patent
Zhang et al.

(10) Patent No.: US 12,458,621 B1
(45) Date of Patent: Nov. 4, 2025

(54) APPLICATION OF GENIPIN BETA-METHYL DERIVATIVE GEN-17 IN PREPARATION OF DRUG FOR PREVENTION AND TREATMENT OF ACUTE SEVERE PNEUMONIA

(71) Applicant: KUNMING MEDICAL UNIVERSITY, Kunming (CN)

(72) Inventors: Xuan Zhang, Kunming (CN); Wenbin Shang, Kunming (CN); Yushan Zhu, Kunming (CN); Lei He, Kunming (CN); Susu Fan, Kunming (CN); Xuerong Peng, Kunming (CN); Yaru Sun, Kunming (CN); Yingyue Hu, Kunming (CN)

(73) Assignee: KUNMING MEDICAL UNIVERSITY, Kunming (CN)

( * ) Notice: Subject to any disclaimer, the term of this patent is extended or adjusted under 35 U.S.C. 154(b) by 0 days.

(21) Appl. No.: 19/218,915

(22) Filed: May 27, 2025

(30) Foreign Application Priority Data

May 30, 2024 (CN) .......................... 2024106905129

(51) Int. Cl.
*A61K 31/352* (2006.01)
*A61P 11/00* (2006.01)
(52) U.S. Cl.
CPC ............ *A61K 31/352* (2013.01); *A61P 11/00* (2018.01)
(58) Field of Classification Search
CPC .............................. A61K 31/352; A61P 11/00
USPC ........................................................ 514/456
See application file for complete search history.

(56) References Cited

FOREIGN PATENT DOCUMENTS

CN 102993158 A 3/2013

OTHER PUBLICATIONS

Wang Qin, "Role and Mechanism of Uncoupling Protein 2 in Lipopolysaccharide-Induced Acute Lung Injury", China Doctoral Dissertations Full-text Database (Medical and Health Sciences Series), 2017, Issue 2: E063-20.
CNIPA, Notification of First Office Action for CN202410690512.9, Dec. 31, 2024.
Kunming Medical University (Applicant), Replacement claims (allowed) of CN202410690512.9, Mar. 3, 2025.
CNIPA, Notification to grant patent right for invention in CN202410690512.9, Apr. 4, 2025.

*Primary Examiner* — Taylor V Oh
(74) *Attorney, Agent, or Firm* — Hemisphere Law, PLLC; Zhigang Ma

(57) ABSTRACT

An application of a genipin beta-methyl derivative, Gen-17, in a preparation of a drug for prevention and treatment of acute severe pneumonia is provided. A mouse model of acute lung injury (ALI) is first used to simulate acute severe pneumonia of human beings, and preventive and therapeutic effects of the Gen17 on mice with ALI are systematically evaluated. The results show that the Gen17 can significantly alleviate pathomorphological damage of lung tissues of ALI mice induced by lipopolysaccharide, and inhibit inflammatory reaction and oxidative stress of the lung tissues. A protective mechanism of the Gen-17 on the lung of the ALI mice is that an anti-inflammatory role is played by inhibiting NF-κB and MAPK signaling pathways, and an anti-oxidative role is played by activating Keap1/Nrf2/HO-1 signaling pathways. It can provide some experimental basis for the application of the Gen-17 in prevention and treatment of acute severe pneumonia.

4 Claims, 13 Drawing Sheets

APPLICATION OF GENIPIN BETA-METHYL DERIVATIVE GEN-17 IN PREPARATION OF DRUG FOR PREVENTION AND TREATMENT OF ACUTE SEVERE PNEUMONIA

CROSS-REFERENCE TO RELATED APPLICATION

This application claims priority to Chinese Patent Application No. 202410690512.9, filed on May 30, 2024. The entire contents of the above-mentioned application are incorporated herein by reference.

TECHNICAL FIELD

The disclosure relates to the field of pharmaceutical technologies, and more particularly to an application of a genipin beta-methyl derivative, Gen-17, in a preparation of a drug for prevention and treatment of acute severe pneumonia.

BACKGROUND

Acute severe pneumonia is a common clinical critical illness caused by many reasons (bacterial or viral infection, trauma, etc.), which has a high incidence rate and high mortality rate and seriously threatens life safety of patients. A variety of pathogenic factors directly or indirectly cause acute lung injury (ALI), systemic inflammatory response syndrome or multiple organ dysfunction syndrome. Clinically, main manifestations are intractable hypoxemia, high edema in alveoli and lung parenchyma, and may lead to acute respiratory distress syndrome (ARDS) in severe cases.

ALI is a common clinical acute severe pneumonia with complicated etiology. The occurrence of ALI is related to environmental factors, severe lung infection, lung trauma, acute pancreatitis, drowning, sepsis, heredity, drugs and other factors. Although ALI/ARDS has been deeply studied at home and abroad in recent years, the overall quality of life and survival rate of patients with ALI/ARDS are low because of its complicated etiology, unclear pathogenesis and no curable drugs in clinic. Therefore, it is necessary to actively explore and develop new and efficient drugs to reverse ALI.

Although a variety of comprehensive treatment schemes are used for acute severe pneumonia in clinic, it is usually difficult for patients' lung function to return to normal level after treatment. At present, anti-inflammatory drugs such as dexamethasone (DEX), prednisolone, prednisone and ulinastatin are widely used in clinical treatment of acute severe pneumonia. However, the quality of life and mortality of patients have not been substantially improved, and these drugs can also cause various adverse side effects, including decreased immune function, coagulation dysfunction, gastric ulcer and osteoporosis. Therefore, it is urgent to find new drugs with high efficiency and low toxicity to prevent and treat acute severe pneumonia.

SUMMARY

In view of the above shortcomings in the related art, a purpose of the disclosure is to provide an application of a genipin beta-methyl derivative, Gen-17, in a preparation of a drug for prevention and treatment of acute severe pneumonia.

In order to achieve the purpose of the disclosure, a technical solution adopted by the disclosure is as follows.

Specifically, an application of a genipin beta-methyl derivative, Gen-17, in a preparation of a drug for prevention and treatment acute severe pneumonia is provided, where a chemical structure of the Gen-17 is as follows:

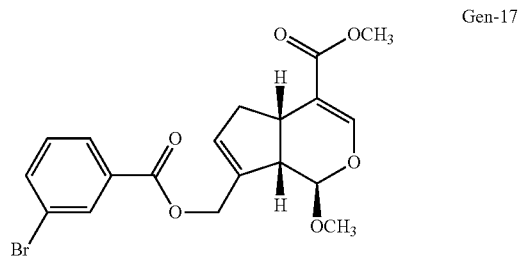 [SMILES: COC(=O)C1=CO[C@@H](OC)[C@@H]2C(COC(=O)c3cccc(Br)c3)=CC[C@H]12]

In an embodiment, the drug is one selected from the group consisting of tablets, capsules, drops, pills, sustained-release and controlled-release preparations, injections, dry powder inhalers, metered-dose inhalers, and aerosols.

The disclosure has the following beneficial effects.

A mouse model of ALI is first used to simulate human acute severe pneumonia, and the preventive and therapeutic effects of the Gen-17 on mice with ALI are systematically evaluated. The results show that the Gen-17 can significantly alleviate the pathomorphological damage of lung tissues of ALI mice induced by lipopolysaccharide (LPS), and inhibit the inflammatory reaction and oxidative stress of the lung tissues. A protective mechanism of the Gen-17 on the lung of the ALI mice is that an anti-inflammatory role is played by inhibiting nuclear factor kappa B (NF-κB) and mitogen-activated protein kinase (MAPK) signaling pathways, and an anti-oxidative role is played by activating Kelch-like ECH-associated protein 1 (Keap1)/nuclear factor erythroid 2-related factor 2 (Nrf2)/heme Oxygenase-1 (HO-1) signaling pathways. The disclosure can provide some experimental basis for the application of the Gen-17 in the prevention and treatment of acute severe pneumonia.

BRIEF DESCRIPTION OF DRAWINGS

In FIG. 2 and FIGS. 4-13, compared with a normal saline (NS) group, *P<0.05, P<0.01, *P<0.001; compared with a LPS group, #P<0.05, ##P<0.01, ###P<0.001; compared with a DEX group, *P<0.05, P<0.01, *P<0.001; and compared with a low-dose group, ▲P<0.05, ▲▲P<0.01, ▲▲▲P<0.001.

DETAILED DESCRIPTION OF EMBODIMENTS

Figure 1:
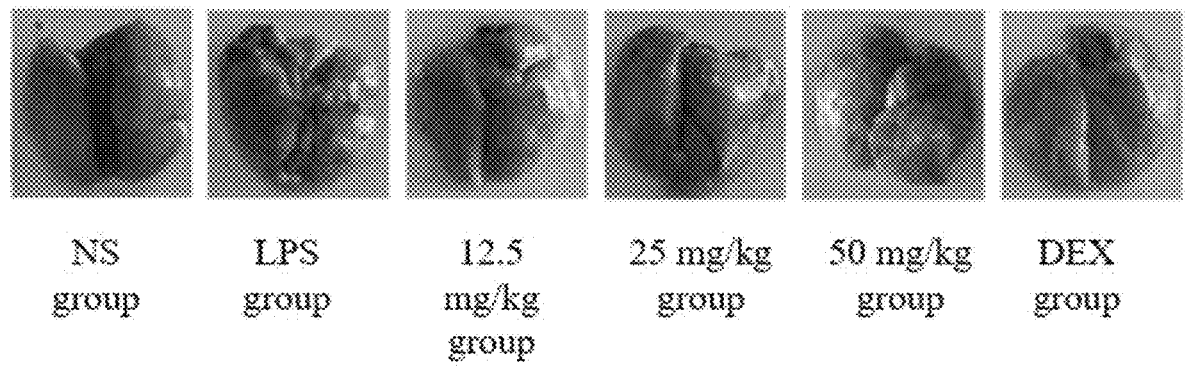
FIG. 1 illustrates gross specimens of mouse lung tissues.

Specific embodiments of the disclosure will be described below, so as to facilitate those skilled in the art to understand the disclosure. However, it should be understood that the disclosure is not limited to the scope of the specific embodiments. As long as various changes are within the spirit and scope of the disclosure defined and determined by the appended claims, they are apparent to those skilled in the art, and all inventions using the concept of the disclosure are protected.

Embodiment 1

Synthesis of genipin beta-methyl derivative Gen-17 is presented as follows.

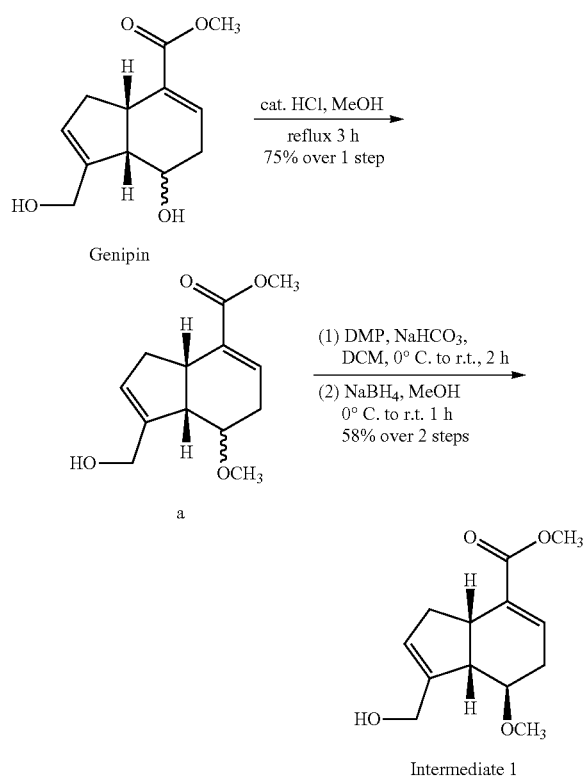

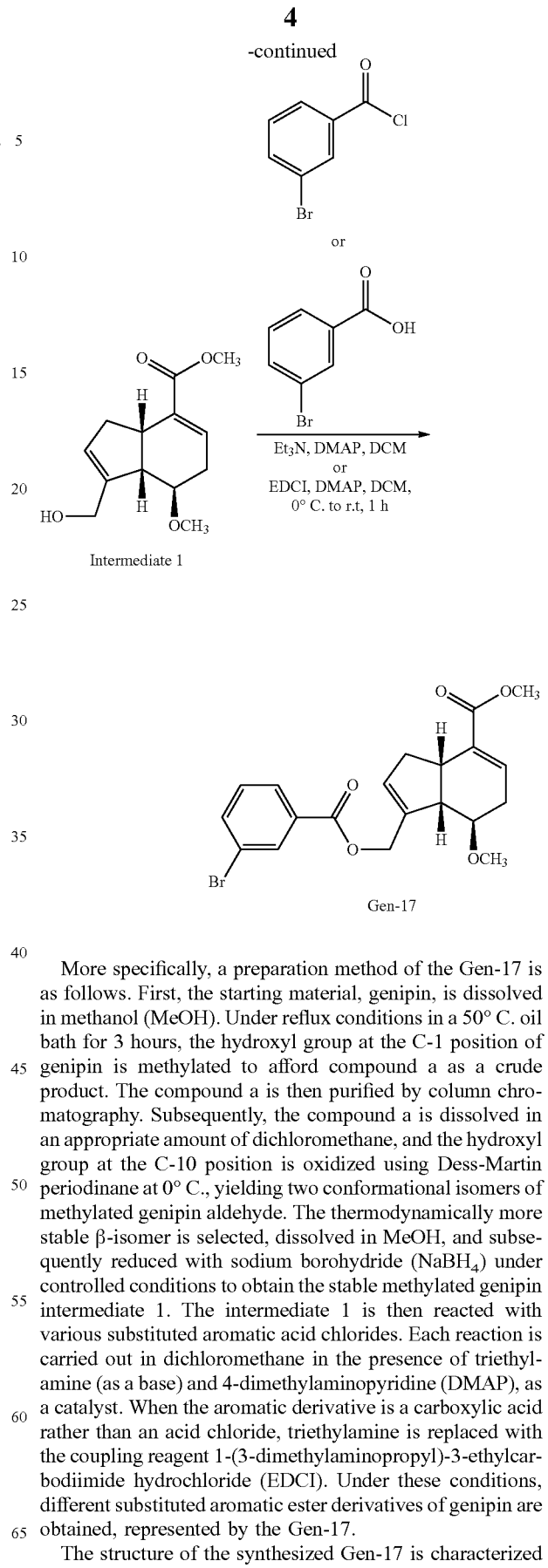

More specifically, a preparation method of the Gen-17 is as follows. First, the starting material, genipin, is dissolved in methanol (MeOH). Under reflux conditions in a 50° C. oil bath for 3 hours, the hydroxyl group at the C-1 position of genipin is methylated to afford compound a as a crude product. The compound a is then purified by column chromatography. Subsequently, the compound a is dissolved in an appropriate amount of dichloromethane, and the hydroxyl group at the C-10 position is oxidized using Dess-Martin periodinane at 0° C., yielding two conformational isomers of methylated genipin aldehyde. The thermodynamically more stable β-isomer is selected, dissolved in MeOH, and subsequently reduced with sodium borohydride (NaBH₄) under controlled conditions to obtain the stable methylated genipin intermediate 1. The intermediate 1 is then reacted with various substituted aromatic acid chlorides. Each reaction is carried out in dichloromethane in the presence of triethylamine (as a base) and 4-dimethylaminopyridine (DMAP), as a catalyst. When the aromatic derivative is a carboxylic acid rather than an acid chloride, triethylamine is replaced with the coupling reagent 1-(3-dimethylaminopropyl)-3-ethylcarbodiimide hydrochloride (EDCI). Under these conditions, different substituted aromatic ester derivatives of genipin are obtained, represented by the Gen-17.

The structure of the synthesized Gen-17 is characterized as follows.

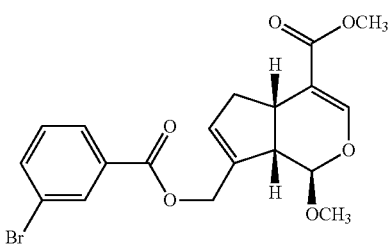

Gen-17

Yellow-brown oily liquid, 75% yield. $^1$H NMR (500 MHZ, CDCl$_3$) δ8.17 (dd, J=2.1, 0.9 Hz, 1H), 8.00-7.96 (m, 1H), 7.69-7.64 (m, 1H), 7.52 (s, 1H), 7.31 (t, J=7.9 Hz, 1H), 5.93 (s, 1H), 4.99 (d, J=13.8 Hz, 1H), 4.94-4.86 (m, 1H), 4.50 (d, J=8.0 Hz, 1H), 3.71 (s, 3H), 3.56 (s, 3H), 3.27-3.18 (m, 1H), 2.91 (dd, J=16.8, 8.5 Hz, 1H), 2.68 (t, J=7.9 Hz, 1H), 2.16-2.05 (m, 1H). $^{13}$C NMR (125 MHz, CDCl$_3$) δ167.7, 164.9, 152.2, 137.9, 136.0, 132.6, 132.1, 131.0, 130.0, 128.2, 122.5, 110.8, 102.7, 63.4, 57.2, 51.3, 46.3, 39.0, 35.5. HRMS(ESI) calcd. for $C_{19}H_{19}BrNaO_6$[M+Na]+: 445.0263, found 445.0266.

Embodiment 2

Application of genipin beta-methyl derivative Gen-17 in acute severe pneumonia

1 Experimental Materials

1.1 Experimental Animals

A total of 144 male specific-pathogen-free (SPF) grade Kunming mice, aged 5-7 weeks and weighing 18-22 grams (g), are provided by the Animal Experiment Center of Kunming Medical University (Animal Production License No.: SCXK (Yunnan) K 2020-0004). The mice are kept in the experimental animal room of the College of Pharmacy of Kunming Medical University, and the experimental environment is constant temperature (22±2° C.) and humidity 60%-70%. The mice have free access to water and food, followed by a natural light-dark cycle, and their status is monitored daily. Animal experiments begin after approximately one week of acclimatization. All procedures adhere to animal welfare regulations and are approved by the Animal Ethics Committee of Kunming Medical University (Approval No.: KMMU2020111).

1.2 Main Reagents

| Main reagents | Manufacturer |
| --- | --- |
| Lipopolysaccharide (LPS) | Beijing Solarbio Biotechnology Co., Ltd. |
| Genipin beta-methyl derivative (Gen-17) | Provided by Associate Researcher Shang Wenbin, School of Pharmacy, Kunming Medical University |
| Dexamethasone (DEX) | Beijing Solarbio Biotechnology Co., Ltd. |
| Normal Saline (NS) | Kunming Nanjiang Pharmaceutical Co., Ltd. |
| 10% Sodium Pentobarbital | Comprehensive Laboratory, School of Pharmacy, Kunming Medical University |
| 4% Neutral Paraformaldehyde | Beijing Solarbio Biotechnology Co., Ltd. |
| Hematoxylin-Eosin Staining Solution | Xiamen Mabwell Biopharmaceutical Company |
| BCA Protein Concentration Assay Kit (Enhanced Type) | Proteintech Company |
| Mouse IL-1β ELISA Kit | Proteintech Company |
| Mouse TNF-α ELISA Kit | Proteintech Company |
| Mouse IL-6 ELISA Kit | Proteintech Company |
| Malondialdehyde (MDA) Assay Kit | Nanjing Jiancheng Institute of Biological Engineering |
| Total Superoxide Dismutase (SOD) Assay Kit | Nanjing Jiancheng Institute of Biological Engineering |
| Efficient PIPA Tissue/Cell Lysis Solution | Beijing Solarbio Biotechnology Co., Ltd. |
| Protein Phosphatase Inhibitor Cocktail | Beijing Solarbio Biotechnology Co., Ltd. |
| One-step PAGE Gel Rapid Preparation Kit | Shanghai Epizyme Biotechnology Co., Ltd. |
| Sodium Dodecyl Sulfate (SDS) | Beijing Solarbio Biotechnology Co., Ltd. |
| Glycine | Beijing Solarbio Biotechnology Co., Ltd. |
| Tris-base | Beijing Solarbio Biotechnology Co., Ltd. |
| 5x Protein Sample Buffer | Beijing Solarbio Biotechnology Co., Ltd. |
| PVDF Membrane | Millipore Corporation, USA |
| Polysorbate-20 | Beijing Solarbio Biotechnology Co., Ltd. |
| Sodium Chloride | Beijing Solarbio Biotechnology Co., Ltd. |
| Potassium Chloride | Beijing Solarbio Biotechnology Co., Ltd. |
| β-actin | Proteintech Company |
| P38 MAPK (D13E1) XP ® Rabbit mAb | Cell Signaling Technology (CST), USA |
| Phospho-p38 MAPK (Thr180/Tyr182) | Cell Signaling Technology (CST), USA |
| ERK1/2 Polyclonal Antibody | Proteintech Company |
| Phospho-ERK1/2 (Thr202/Tyr204) Polyclonal Antibody | Proteintech Company |
| JNK Monoclonal Antibody | Proteintech Company |
| Phospho-JNK (Tyr185) Recombinant Antibody | Proteintech Company |
| NF-κB p65 Monoclonal Antibody | Proteintech Company |
| Nrf2 (L593) Polyclonal Antibody | Nanjing Biogot Biotechnology Co., Ltd. |
| Keap1 Rabbit mAb | Chengdu Zen-Bioscience Co., Ltd. |
| Heme Oxygenase 1 (HO-1/HMOX1) Rabbit pAb (A11919) | Wuhan ABclonal Biotechnology Co., Ltd. |

-continued

| Main reagents | Manufacturer |
| --- | --- |
| Three-color Pre-stained Protein Molecular Weight Standard (10 KDa-250 KDa) | Shanghai Epizyme Biotechnology Co., Ltd. |
| Ultra-sensitive ECL Chemiluminescent Detection Kit | Proteintech Company |
| Non-fat Milk Powder | Heilongjiang Wondersun Dairy Co., Ltd. |
| Methanol | Tianjin Fengchuan Chemical Reagent Technology Co., Ltd. |
| Anhydrous Ethanol (Analytical Grade) | Tianjin Fengchuan Chemical Reagent Technology Co., Ltd. |
| n-Butanol | Tianjin Fengchuan Chemical Reagent Technology Co., Ltd. |
| Xylene | Tianjin Fengchuan Chemical Reagent Technology Co., Ltd. |
| QuickBlock Western Blocking Solution | Beyotime Biotechnology Co., Ltd. |
| Protein-Free Rapid Blocking Solution | Shanghai Epizyme Biotechnology Co., Ltd. |
| Hieff UNICON ® Universal Blue qPCR SYBR Green Master Mix | Yeasen Biotechnology (Shanghai) Co., Ltd. |
| Hifair ® III 1st Strand cDNA Synthesis SuperMix | Yeasen Biotechnology (Shanghai) Co., Ltd. |
| DEPC Water | Shanghai Epizyme Biotechnology Co., Ltd. |

2 Experimental Method 2.1 Experimental Grouping

A total of 144 SPF-grade healthy Kunming mice, aged 5-7 weeks and weighing 18-22 g, are weighed and randomly allocated into six experimental groups: control group (NS), model group (LPS), dexamethasone group (DEX, 0.39 micrograms per kilogram abbreviated as mg/kg), genipin beta-methyl derivative low-dose group (12.5 mg/kg), genipin beta-methyl derivative medium-dose group (25 mg/kg), and genipin beta-methyl derivative high-dose group (50 mg/kg), 24 animals per group, in which 12 animals are used to take lung tissue for the detection of other indicators, and another 12 animals are used to collect BALF.

2.2 Drug administration and establishment method of ALI model

All mice are gavaged with a same volume of 0.9% normal saline once a day in the NS group and the LPS group, DEX solution (0.39 mg/kg) is gavaged once a day in the DEX group, low-dose Gen-17 solution (12.5 mg/kg) is gavaged once a day in the medium-dose Gen-17 group, medium-dose Gen-17 solution (25 mg/kg) is gavaged once a day in the high-dose Gen-17 group, and high-dose Gen-17 solution (50 mg/kg) is gavaged once a day in the high-dose Gen-17 group. The dosage is converted according to the weight of the mice, and the gavage volume is 20 milliliters per kilogram (mL/kg), and the gavage is continued for 3 days. One hour after the gavage on the third day, the ALI model is established by tracheal instillation of LPS solution. The specific experimental procedures are as follows.

① Before the operation, the mice are anesthetized by intraperitoneal injection of 1% sodium pentobarbital (30 mg/kg) according to their body weight.

② Limbs of anesthetized mice are fixed with rubber bands, teeth are wired with thin threads, and neck skin is disinfected with 75% alcohol.

③ A subcutaneous tissue is separated along a longitudinal incision in a middle of the mouse neck until a cartilage ring appeared in an exposed trachea.

④ A microinjector is inserted into the trachea in parallel towards a proximal end for about 1 centimeter (cm). Sterile NS is slowly dripped into the trachea of the control group, and LPS is dripped into the trachea of the other groups.

⑤ After pulling out the microinjector, the mice are upright immediately, rotated and shaken evenly for 2 minutes (min), then the neck wound is sutured, and the state of the mice is observed. After the mice are awake, they are raised as usual.

2.3 Treatment of Experimental Animals and Collection of Lung Tissue Specimens

Samples are collected 24 hours after the animal model is established. The mice are weighed and 12 mice in each group are sacrificed. Lung tissues are collected and the whole lung wet weight is measured. The lung tissues are packaged for hematoxylin and eosin (HE) staining, MDA and SOD content determination, gene and protein detection. The specific experimental procedures are as follows.

① 12 mice in each group are weighed and their necks are dislocated and sacrificed.

② The mice are fixed. The abdomen is wiped with 75% alcohol. The thoracic cavity is then opened, and the lung tissue is removed. After tidying, the lungs are photographed, excess tissues such as the trachea are cleared away, and the wet weight of the whole lung is measured to calculate the lung index.

③ The upper lobe of the left lung is fixed in 4% neutral paraformaldehyde, fixed for 24 hours, paraffin-embedded and sectioned for HE staining.

④ The remaining lung tissues are put into centrifugal tubes separately, quickly frozen in liquid nitrogen, and then stored at −80° C. after the experiment, which is used for the detection of MDA, SOD, western blotting (WB) and reverse transcription polymerase chain reaction (RT-PCR).

2.4 BALF Collection and Processing

BALF is collected 24 hours after the establishment of the animal model. First, the remaining 12 mice in each group are weighed, and then BALF is extracted. The extracted BALF is used for total cell count, total protein content determination and enzyme-linked immunosorbent assay (ELISA) determination of IL-1B, IL-6 and TNF-α in BALF. The specific experimental procedures are as follows:

① After weighing, the mice are anesthetized by intraperitoneal injection of pentobarbital sodium according to their weight;

② When the tail root, hind limbs, eyelash reflex and other activities of mice disappear, and the mice breathe slowly and evenly, the limbs and teeth of mice are fixed, the neck skin of mice is disinfected with 75% alcohol, and the neck tissue is opened longitudinally, so that the tracheal cartilage ring is exposed. Tracheal puncture is performed with a 19G trocar catheter, the needle is inserted for about 1 cm, the needle core is pulled out, a 1 ml syringe is connected, and precooled normal saline (0.8 mL/time, repeat 2 times) is slowly injected. BALF is collected in a 1.5 mL centrifuge tube, and stored on ice (BALF recovery rate: 80% to 95%).

③ BALF is centrifuged at 3,000 g for 10 min at 4° C., and the supernatant is subpackaged and stored at −80° C. The total protein concentration (contents of total protein in BALF) is determined by bicinchoninic acid assay (BCA) and detected by an ELISA kit.

④ Cell precipitate is resuspended by adding a certain amount of phosphate buffered saline (PBS), and mixed evenly to obtain a mixed solution, and 20 microliters (μL) of the mixed solution is added into a 1.5 mL centrifuge tube with 180 μL PBS in advance, and mixed evenly for total cell count.

2.5 Calculation of Lung Index in Mice

The mice in each group are sacrificed by cervical dislocation, and the whole lungs of the mice are removed by dissection. The lungs are weighed after removing the excess tissues such as the trachea to obtain the wet weight of the whole lungs of the mice. The lung index is calculated according to the formula: lung index=lung wet weight/body weight×100%.

2.6 Pathological Analysis of Lung Tissue

The upper lobe of the left lung is fixed with 4% paraformaldehyde solution, embedded in paraffin and sectioned, and stained with HE. The pathological changes in the lung tissues of mice in each group are observed under a microscope. The specific procedures are as follows.

2.6.1 Preparation of Paraffin Sections

① The upper lobe of the left lung is taken and fixed in sufficient 4% paraformaldehyde solution for 24 hours.

② Dehydration: the lung tissue fixed in 4% neutral paraformaldehyde is taken out, and soaked in 70%, 80%, 90% and 95% ethanol for 25 min, and soaked 100% I, 100% II and 100% III anhydrous ethanol for 30 min in turn to remove all moisture in the tissue.

③ Xylene clearing: After removing excess ethanol with absorbent paper, the dehydrated tissue is cleared in xylene I, II, and III for 30 min respectively. If the transparent effect is not satisfactory, the transparent time can be adjusted according to the condition of the reagents.

④ Embedding: the transparent tissue is placed into melted paraffin I and II for 30 min and paraffin III for 60 min respectively. After the paraffin infiltration is completed, the tissue is embedded and stored at room temperature for later use.

⑤ Sectioning: before sectioning, the paraffin block stored at room temperature is placed into a 4° C. refrigerator for 30 min. Then, sections of 4-6 μm thickness are cut using a microtome. The surface of the paraffin block is trimmed to ensure smoothness, and continuous sections are taken. Intact sections are selected, spread in a 45° C. water bath, and then adhered onto glass slides. The slides are dried on a slide warmer at 37° C. for 2 hours, followed by overnight incubation in a 60° C. oven. The next day, the slides are transferred to a 37° C. incubator for storage and later use.

2.6.2 HE Staining

① Baking of sections: the tissue slides are placed into an incubator and baked at 60-65° C. for 25 min.

② Deparaffinization: the tissue slides are immersed in xylene I, II, and III for 10 min respectively (the specific time can be adjusted according to room temperature and the freshness of xylene; higher room temperature or fresher xylene requires shorter immersion time, until no wax residue remains on the tissue).

③ Hydration: After excess xylene is removed with absorbent paper, hydration is performed. The slides are placed in 100% ethanol I and II for 5 min respectively, followed by 95%, 90%, 80%, and 70% ethanol for 1 min respectively, and then air-dried.

④ The slides are stained with hematoxylin for 3.5 min and immediately rinsed with running water for 5 min.

⑤ The slides are differentiated in 1% hydrochloric acid alcohol for 6 seconds(s) and immediately rinsed with running water for 15 min.

⑥ The slides are placed in 90% ethanol for 10 s, then stained with eosin for 1 min, and rinsed with tap water until the water becomes clear.

⑦ The slides are gently lifted and dipped 10 times in 70%, 80%, and 90% ethanol, respectively.

⑧ The slides are placed in 95% ethanol for 2 min, followed by 100% ethanol I and II for 2 min respectively.

⑨ Clearing: after removing excess ethanol, the slides are cleared in xylene I and II for 5 min respectively, and in xylene III for 15 min.

⑩ Sealing: the slides are air-dried and sealed with neutral gum.

2.6.3 Pathomorphological Observation of Lung Tissue

After sealing, Nikon DS-Ri2 automatic microscope is used to observe and take pictures for analysis.

2.6.4 Lung Histopathological Alveolitis Score

Pathological features of HE and Masson staining sections are observed under a microscope, and alveolitis and fibrosis are scored. The scoring method of the grade data is: (−) is recorded as 1 point, (+) is recorded as 2 points, (++) is recorded as 3 points, (+++) is recorded as 4 points, as follows.

Alveolitis scoring criteria: referring to the method reported by Szapiel (Szapiel S V, Elson N A, Fulmer J D, Hunninghake G W, Crystal R G. Bleomycin-induced interstitial pulmonary disease in the nude, athymic mouse. Am Rev Respir Dis, 1979, 120 (4): 893-899.), alveolitis is scored on lung tissue sections.

Grade 0: no alveolitis (−), normal alveolar structure, no thickening of alveolar wall and no widening of alveolar space.

Grade 1: mild (+), alveolar structure is still intact, alveolar wall is thickened, alveolar septum is widened, and the lesion area accounts for less than 20% of the whole lung.

Grade 2: moderate (++), alveolar wall is significantly thickened, alveolar septum is significantly widened, and the lesion area accounts for 20%-50% of the whole lung.

Grade 3: severe (+++), diffuse alveolitis, exudation of a large number of inflammatory cells, pulmonary parenchymal changes caused by alveolar hemorrhage, with the lesion area exceeding 50% of the whole lung.

2.7 Total Cell Count

In the cell counting plate, 20 μL of evenly mixed cell precipitate is taken with a pipette, and the total cell count of ALI mice in each group is counted with a CountStar automatic cell counter.

2.8 Detection of the Total Protein Concentration in BALF by BCA

① According to the instructions of BCA kit, the protein standard is diluted with double-distilled water in a concentration gradient, and the BCA working solution is prepared with solution A: solution B=50:1 for later use.

② In a 96-well plate, 20 μL/well of different concentrations of standards are added to make standard curves (3 vice-wells), 20 μL/well of samples to be tested (3 vice-wells) are added, and then 200 μL/well of BCA working solution is added. After mixing, the samples are incubated at 37° C. for 30 min.

③ The optical density (OD) value is measured at the wavelength of 562 nanometers (nm), and the total protein concentration in BALF is calculated according to the standard curve.

2.9 Detection of Contents of IL-1B, IL-6 and TNF-α in BALF by ELISA

The subpackaged samples are taken out and melted on ice, and the contents of IL-1B, IL-6 and TNF-α in cell supernatant are detected by ELISA kit. The specific procedures are the same as those in the section 2.4.

2.10 Detection of Expression of Related Genes in Lung Tissue by qRT-PCR

The lung tissue is taken out from −80° C., and its weight is accurately measured. The lung tissue is then cut and placed into a precooled glass homogenizer that has been prerinsed with TRIzol® reagent (an acid-guanidinium-phenol-based reagent). TRIzol® reagent is added to the glass homogenizer at a ratio of 1 mL per 50-100 mg of sample, and the tissue is ground thoroughly. The homogenized tissue is transferred to a 1.5 mL centrifuge tube and placed on ice for 15 min, during which the mixture is inverted several times to ensure even mixing. Then, the sample is centrifuged at 4° C. at 12,000 revolutions per minute (rpm) for 15 min. The subsequent procedures are consistent with those described in the section 2.5.

2.11 Detection of MDA Activity in Lung Tissue

The lung tissue is taken out from −80° C., and its weight is accurately measured. 9 times the volume of precooled saline is added according to a ratio of the lung weight (g): volume (mL)=1:9. The lung tissue is then ground into a 10% tissue homogenate using a tissue grinder on ice. The homogenate is centrifuged at 4° C. at 3,000 rpm for 10 min, and the supernatant is collected for analysis. The protein concentration of the 10% tissue homogenate is determined using the BCA. The subsequent procedures are performed according to the section 2.7.

2.12 Detection of SOD Activity in Lung Tissue

The lung tissue is taken out from −80° C., and its weight is accurately measured. 9 times the volume of precooled NS is added according to a ratio of the lung weight (g): volume (mL)=1:9. The lung tissue is then ground into a 10% tissue homogenate using a tissue grinder on ice. The homogenate is centrifuged at 4° C. at 3,000 rpm for 10 min, and the supernatant is collected for analysis. The protein concentration of the 10% tissue homogenate is determined using the BCA. Before the formal experiment, two samples are randomly selected from normal tissues and diluted to different concentrations for pre-experiment to detect the SOD inhibition rate of the samples, and the concentration of this hole with inhibition rate of 40%-60% is selected for the formal experiment. According to the results of the pre-experiment, the supernatant of 10% tissue homogenate of mice is diluted 30 times. The subsequent experimental procedures are consistent with the section 2.8.

2.13 Detection of Expression of Related Proteins by WB

2.13.1 Preparation of Tissue Samples

The lung tissue is taken out from −80° C., and its weight is accurately measured. The cut lung tissue is placed into a prerinsed and precooled glass homogenizer with protein lysis solution. Lysis solution is added to the glass homogenizer at a ratio of 100 liters (L) per 100 mg sample. On ice, the tissue is thoroughly ground, and then the tissue homogenate is transferred to a 1.5 mL centrifuge tube. The homogenate is sonicated for 10 seconds with an ultrasonic disruptor, followed by a 10-second interval; this process is repeated three times, and then the disrupted product is placed on ice again.

The lung tissue is lysed for 30 min to ensure complete lysis. Then, the lysed product is centrifuged at 12,000 rpm for 15 min, the supernatant is taken and transferred to a new 1.5 mL centrifuge tube, which is labeled. The protein concentration is detected using BCA. Based on the total protein concentration, 5× Loading Buffer and protein lysis solution are added to adjust all proteins to a uniform concentration of 6 micrograms per microliter (μg/uL). After mixing, the mixture is boiled in a water bath for 10 min to denature the proteins. After cooling, the samples are aliquoted and stored at −80° C. Subsequent experimental procedures are consistent with those described in the section 2.10.

3. Statistical Methods

The experimental data are statistically analyzed by SPSS® v23.0 statistical analysis software, and the measurement data are expressed by the mean±standard deviation ($\bar{x}\pm S$). When the measurement data are subject to normal distribution and the variances are homogeneous, the differences between groups are tested by one-way analysis of variance (One-Way ANOVA). The Student-Newman-Keuls test (SNK) test (also referred to as q test) are compared between groups, and $P<0.05$ is regarded as statistically significant. The GraphPad Prism 8 software is used to draw the relevant results.

4 Experimental results

4.1 Gross Specimen and Lung Index of Mouse Lung Tissue

As shown in FIG. 1, the surface of lung tissue in the NS group is lustrous without edema, and the tissue appears pink with a uniform color. Compared with the NS group, significant edema is observed in the lung tissue of the LPS group, with obvious spots on the surface and darker tissue color. Various drug groups exhibit different degrees of edema in the lung tissue of mice, but compared with the LPS group, the degree of edema and the luster of the tissue surface are improved to varying degrees.

Figure 2:
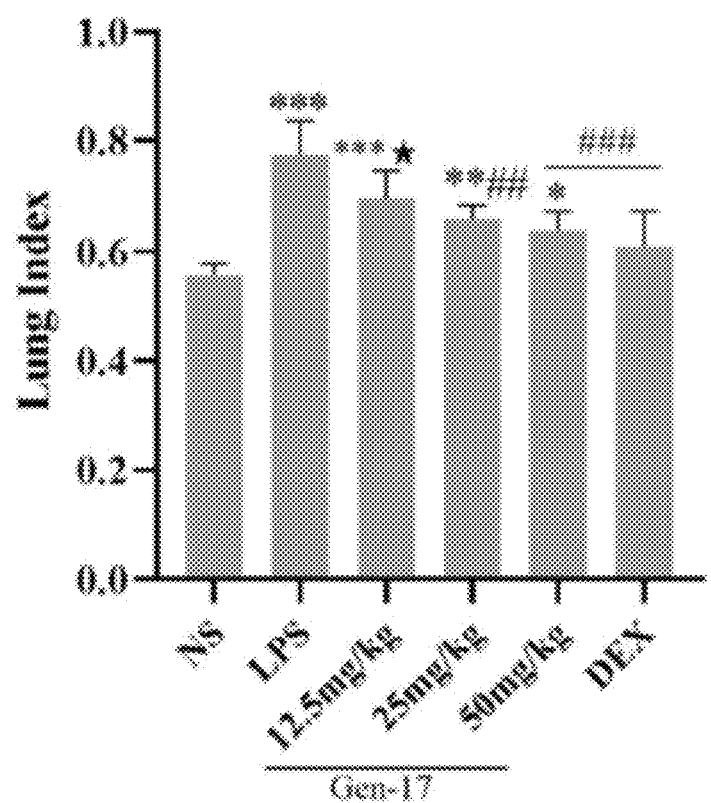
FIG. 2 illustrates lung indexes of mice ($\bar{x}\pm S$, n=6).

Lung index is an important index to characterize the degree of edema in lung tissue. As shown in FIG. 2, compared with the NS group, the changes in lung index in the LPS group and the Gen-17 groups are statistically significant ($P<0.05$), suggesting the occurrence of acute pulmonary edema. After drug treatment, the lung index of mice decreases to different degrees. Compared with the LPS group, the changes in lung index of mice in the medium-dose group and the high-dose group of Gen-17 and the DEX group are statistically significant (P<0.01). Compared with the DEX group, the lung index of mice increases most significantly in the low-dose Gen-17 group, and the difference is statistically significant (P<0.05). The results show that Gen-17 could reduce the degree of pulmonary edema in ALI mice to varying degrees.

Figure 3:
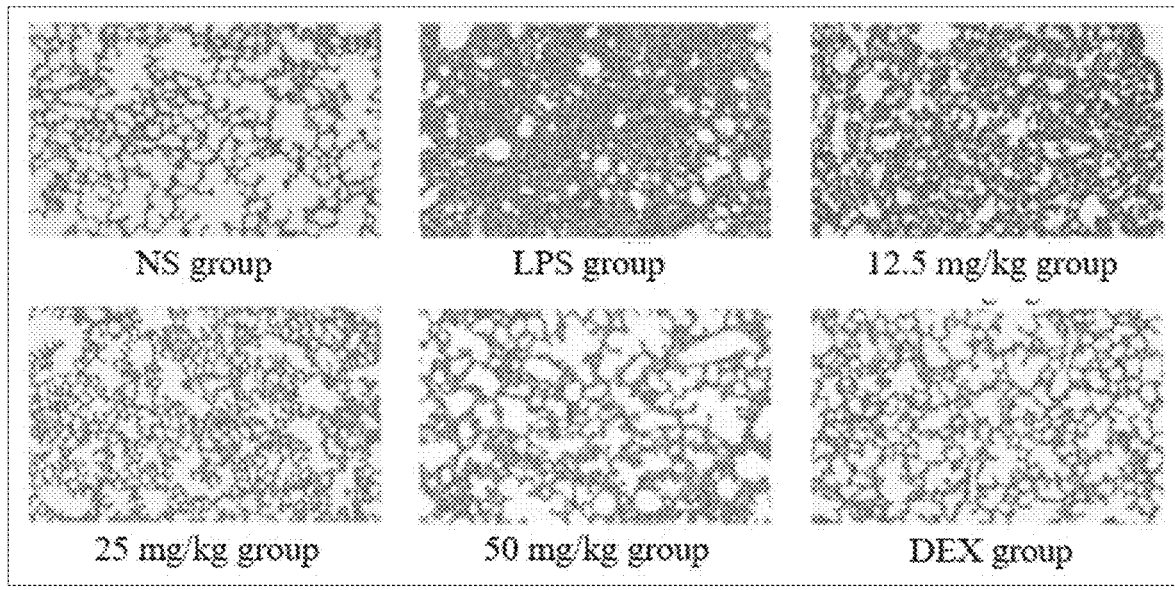
FIG. 3 illustrates a pathological diagram of the mouse lung tissues.
Figure 4:
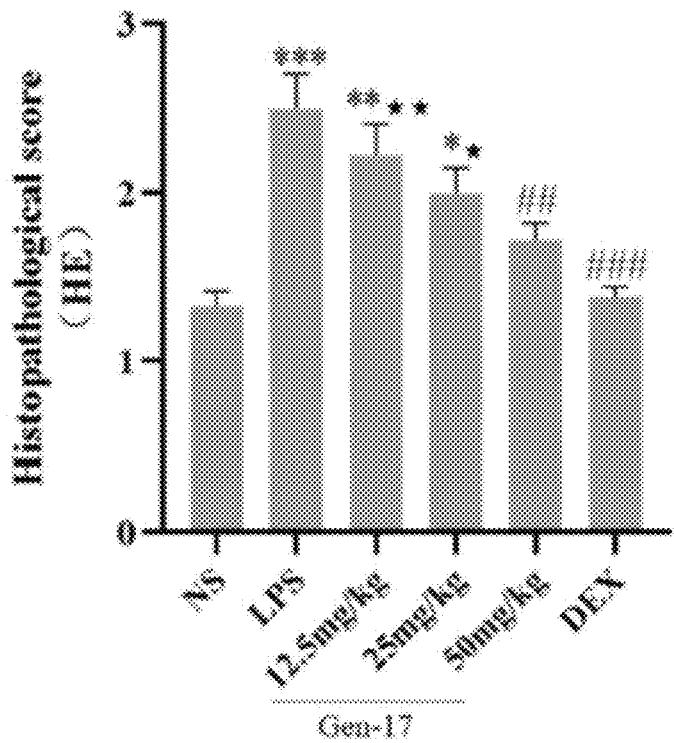
FIG. 4 illustrates results of histopathological scores of the mouse lung tissues.

4.2 Effect of Genipin Beta-Methyl Derivative on Histopathology of LPS-Induced ALI Mice The damage of tissues is well evaluated through histopathological morphology, and the effect of Gen-17 on lung tissue LPS-induced mice is evaluated by HE staining. The pathological diagram and pathological score of mouse lung tissue are shown in FIGS. 3-4. Specifically, in the NS group, the structure of lung tissue is normal, alveolar intervals are regular, alveolar walls are thin, and a small number of inflammatory cells are visible. Compared with the NS group, the lung tissue in the LPS group shows significant infiltration of inflammatory cells and bleeding, thickening of interstitial tissue, loss of alveolar structure, and partial pulmonary interstitial hemorrhage; and the pathological score is significantly increased, which is statistically significant (P<0.001). Compared with the LPS treatment group, the Gen-17 groups and the DEX group can significantly alleviate the pathological damage of the LPS-induced lung tissue. The high-dose group of Gen-17 and the DEX group can significantly improve the pathological damage of lung tissue, and the pathological score is significantly reduced, which is statistically significant (P<0.01). Compared with the DEX group, the pathological scores of alveolitis in the low-dose group and medium-dose group of Gen-17 are increased, and the differences are statistically significant (P<0.05). The results indicate that Gen-17 can reduce the inflammatory response of the LPS-induced ALI mice and improve the pathological structure of lung tissue and alveolitis scores to varying degrees.

4.3 Total Protein Concentration in BALF

Figure 5:
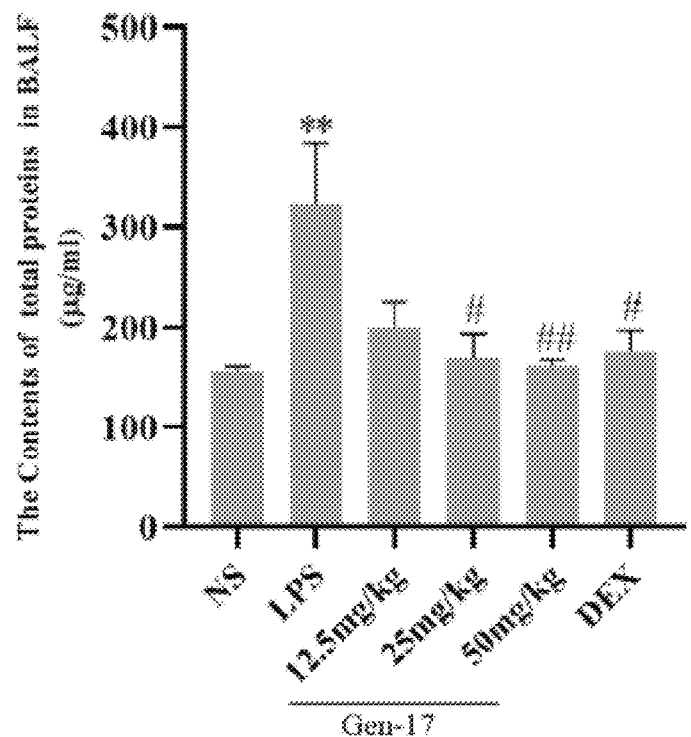
FIG. 5 illustrates contents of total protein in bronchoalveolar lavage fluid (BALF) ($\bar{x}\pm S$, n=6).

When an inflammatory response occurs in lung tissue, the permeability of pulmonary capillaries decreases, which leads to a large number of proteins entering the interstitial space, resulting in an increase in protein concentration. Therefore, the total protein concentration in BALF is used to reflect the degree of inflammatory response in lung tissue. As shown in FIG. 5, compared with the NS group, the total protein concentration in BALF of the LPS group is significantly increased, and the difference is statistically significant (P<0.01). Compared with the LPS group, after drug intervention, the total protein concentration in BALF of each drug dose group is decreased, the total protein content in BALF of the middle-dose Gen-17 group, the high-dose Gen-17 group, the low-dose Gen-17 group, and the DEX group could be significantly reduced, and the difference is statistically significant (P<0.05). The results show that Gen-17 can reduce the permeability of pulmonary capillaries and protein exudation.

4.4 Total Cell Count in BALF

Figure 6:
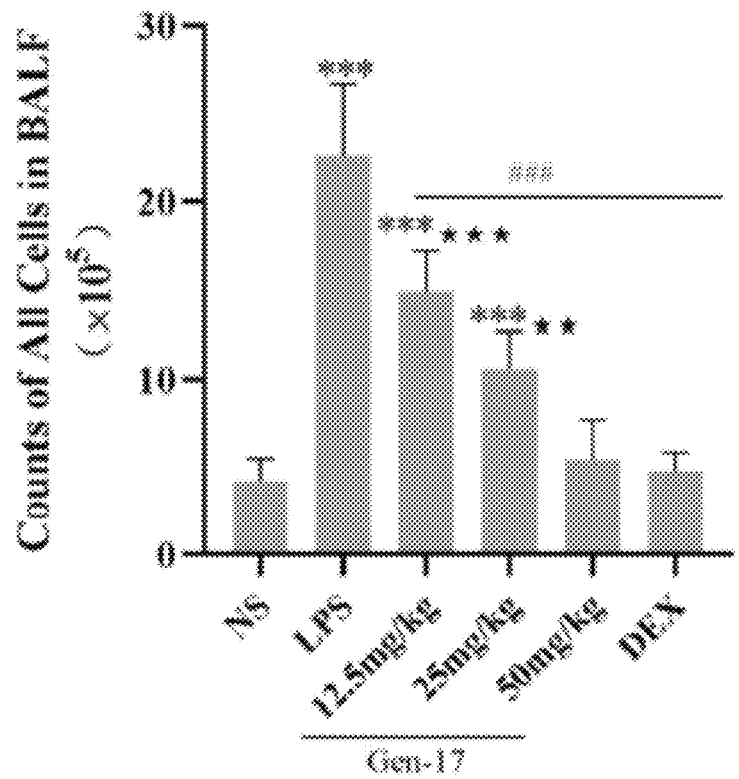
FIG. 6 illustrates counts of all cells in the BALF ($\bar{x}\pm S$, n=6).

The experimental results are shown in FIG. 6. Compared with the NS group, the total cell counts in BALF in the LPS group, the low-dose Gen-17 group, and the middle-dose Gen-17 group are significantly increased, and the difference is statistically significant (P<0.001). Compared with the LPS group, the total cell counts in BALF of the Gen-17 groups and the DEX group are decreased significantly after drug treatment, and the difference is statistically significant (P<0.001). In addition, compared with the DEX group, the total cell counts in BALF of the low-dose Gen-17 group and the middle-dose Gen-17 group are significantly increased, and the difference is statistically significant (P<0.01). The results show that Gen-17 can reduce the total cell count, decrease cell exudation, and alleviate lung tissue inflammation in BAFL of ALI mice.

Figure 7A:
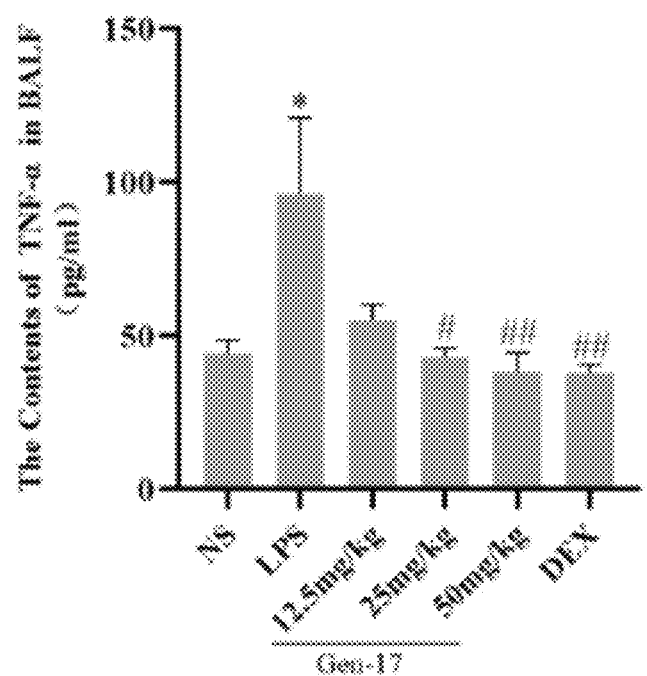
FIGS. 7A-7C illustrate contents of tumor Necrosis Factor-alpha (TNF-α), interleukin-1 beta (IL-1B) and interleukin-6 (IL-6) in the BALF ($\bar{x}\pm S$, n=6).
Figure 7B:
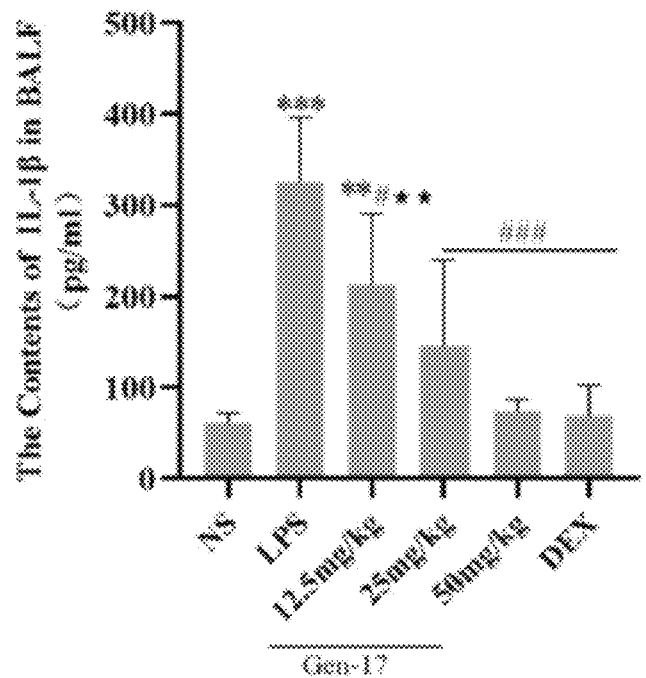
Figure 7C:
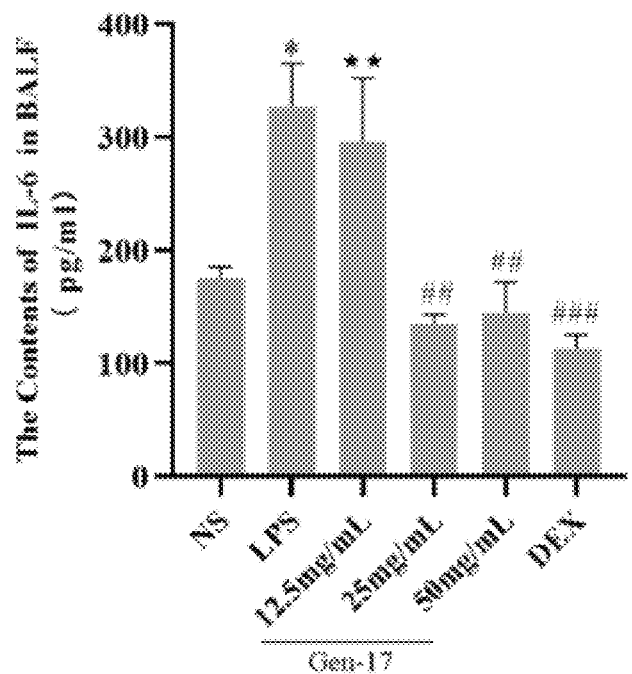
Figure 8A:
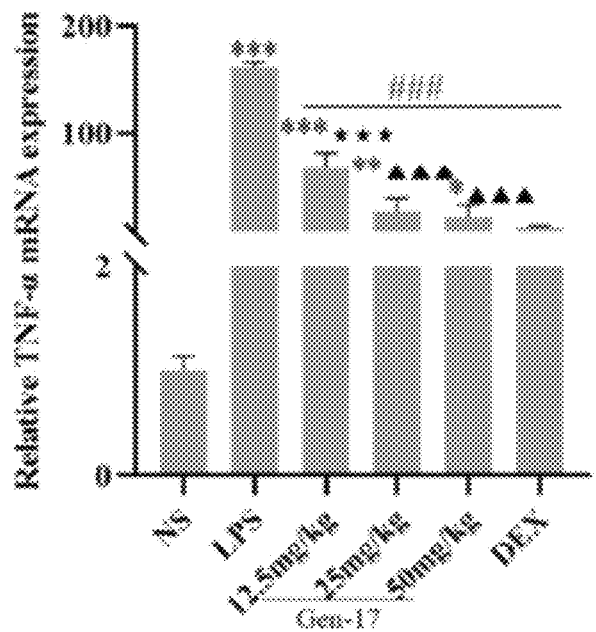
FIGS. 8A-8F illustrate effects of Gen-17 on expressions of inflammatory cytokines in lung tissues of ALI mice ($\bar{x}\pm S$, n=6).
Figure 8B:
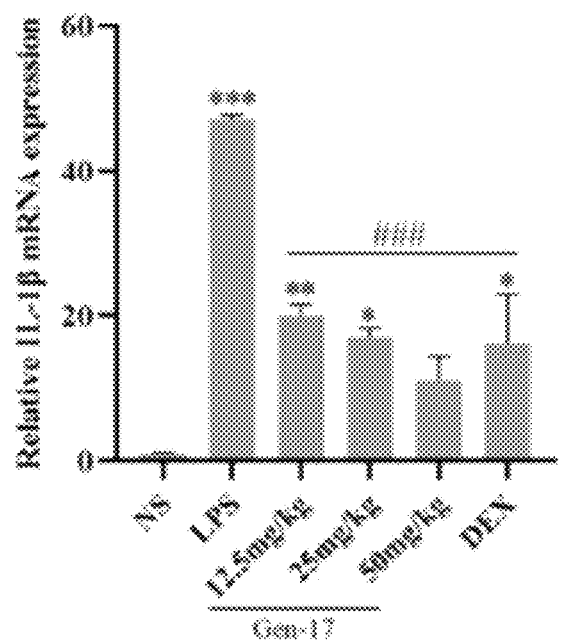
Figure 8C:
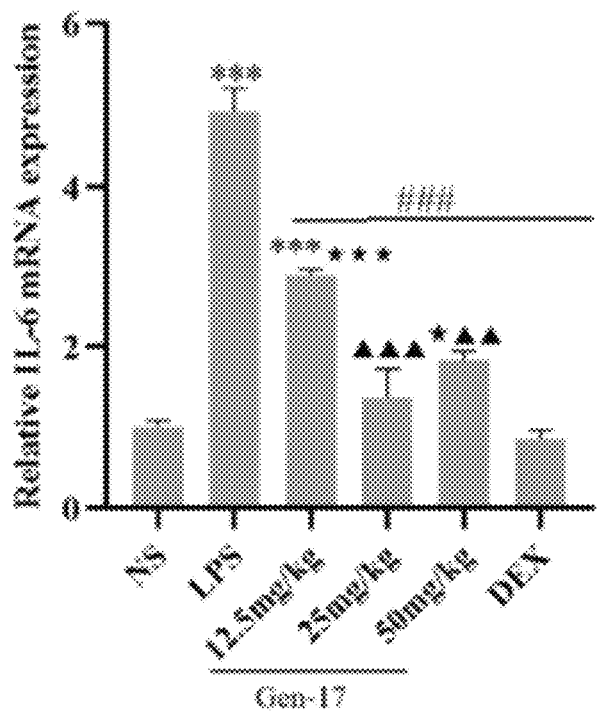
Figure 8D:
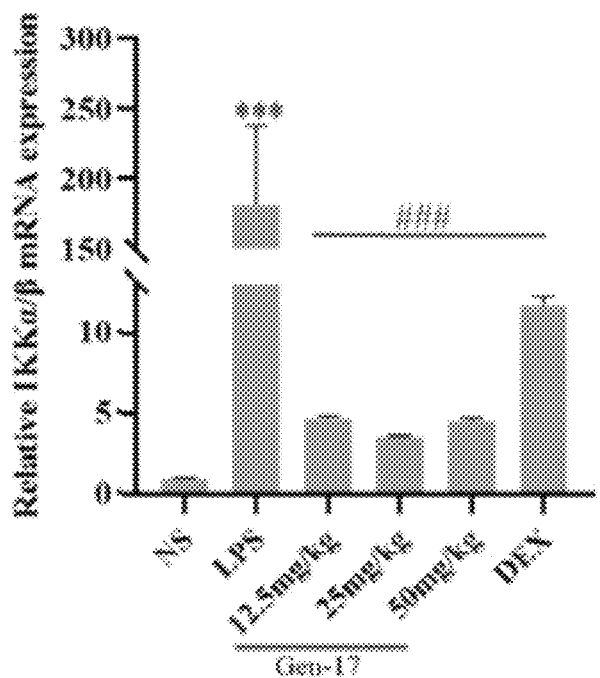
Figure 8E:
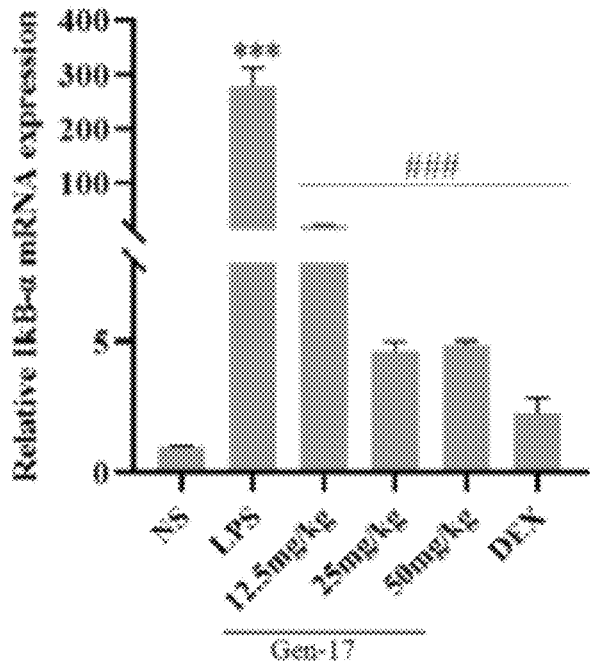
Figure 8F:
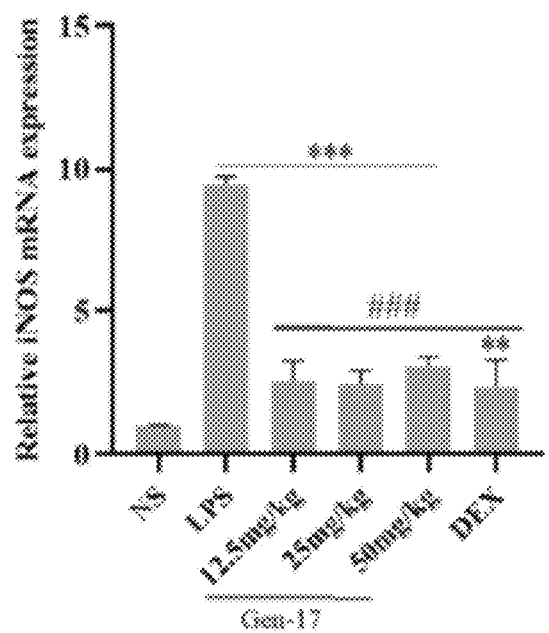

4.5 Effect of Gen-17 on the Expression of Inflammatory Cytokines TNF-α, IL-1ß and IL-6 in BALF of ALI Mice As shown in FIGS. 7A-7C, the results of ELISA show that the contents of inflammatory cytokines TNF-α, IL-1β and IL-6 are increased significantly after LPS induction in mice. Compared with the NS group, the contents of inflammatory cytokines TNF-α, IL-1β and IL-6 in BALF of the LPS group are significantly increased, and the difference is statistically significant (P<0.05). When compared with the LPS group, the Gen-17 groups and the DEX group can reduce the contents of inflammatory cytokines TNF-α, IL-1B, and IL-6 in the BALF of mice to varying degrees, except for TNF-α and IL-6 in the low-dose Gen-17 group, and the differences in other cytokines are statistically significant (P<0.05). Compared with the DEX group, there is no statistically significant difference in the reduction of the TNF-α level by Gen-17 (P>0.05), but the low-dose Gen-17 group shows a statistically significant reduction in IL-1β and IL-6 levels (P<0.01). The results demonstrate that after treatment with Gen-17, the contents of TNF-α, IL-1β, and IL-6 are significantly inhibited, indicating that Gen-17 can influence the progression of ALI through its anti-inflammatory effects.

4.6 Effect of Gen-17 on Gene Expression of Inflammatory Cytokines in Lung Tissue of ALI Mice In order to explore the inhibitory effect of Gen-17 on proinflammatory cytokines, the mRNA expression of proinflammatory cytokines in mouse lung tissue is detected. As shown in FIGS. 8A-8F, compared with the NS group, the expression of proinflammatory cytokines TNF-α, IL-1β, IL-6, inhibitor of κB Kinase α/β (IKKα/β), inhibitor of κB a (IkB-α) and inducible nitric oxide synthase (iNOS) in lung tissue of mice is significantly upregulated after LPS induction (P<0.001). Compared with the LPS group, Gen-17 can significantly reduce the expression of proinflammatory cytokines TNF-α, IL-1β, IL-6, IKKα/β, IkB-α and iNOS in lung tissue, and the difference is statistically significant (P<0.001). Compared with the DEX group, only the low-dose Gen-17 group had statistical significance in inhibiting the expression of TNF-α and IL-6 (P<0.001). The results show that Gen-17 can inhibit the expression of inflammatory cytokines in lung tissue of ALI mice.

Figure 9A:
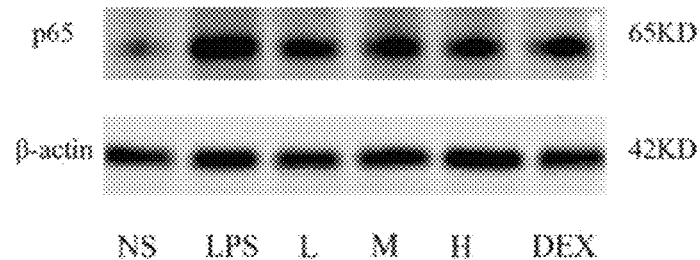
FIGS. 9A-9B illustrate expression of NF-κB p65 protein in the lung tissues ($\bar{x}\pm S$, n=6).
Figure 9B:
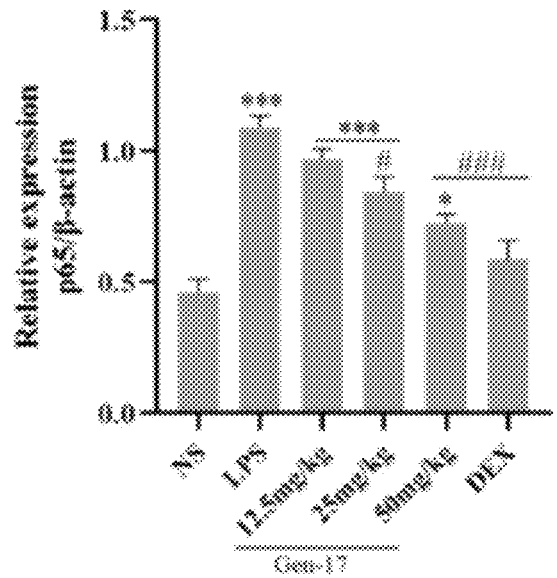
Figure 10A:
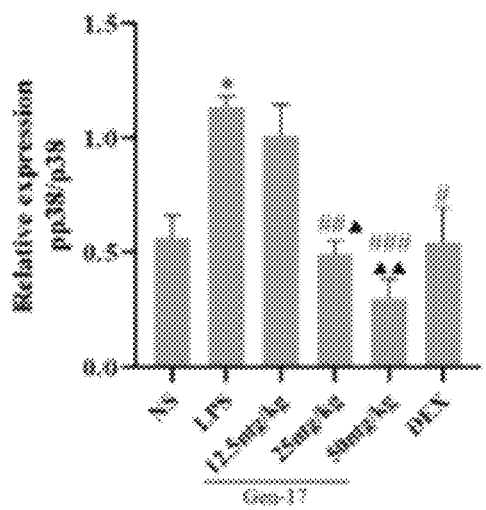
FIGS. 10A-10D illustrates expression of p38 mitogen-activated protein kinase (p38), extracellular signal-regulated kinase (ERK), c-Jun N-terminal kinase (JNK) and their phosphorylated proteins in the lung tissues ($\bar{x}\pm S$, n=3).
Figure 10B:
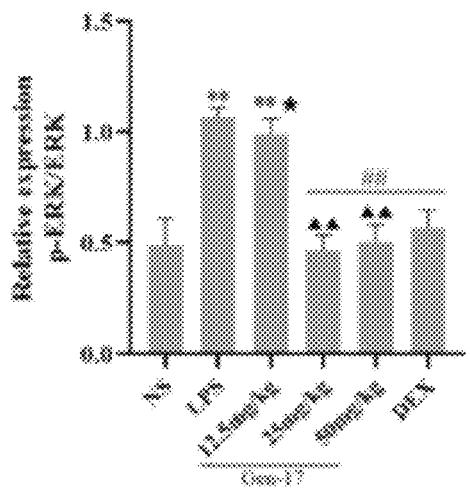
Figure 10C:
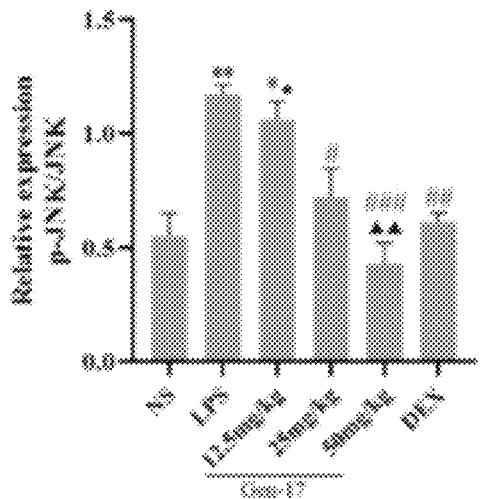
Figure 10D:
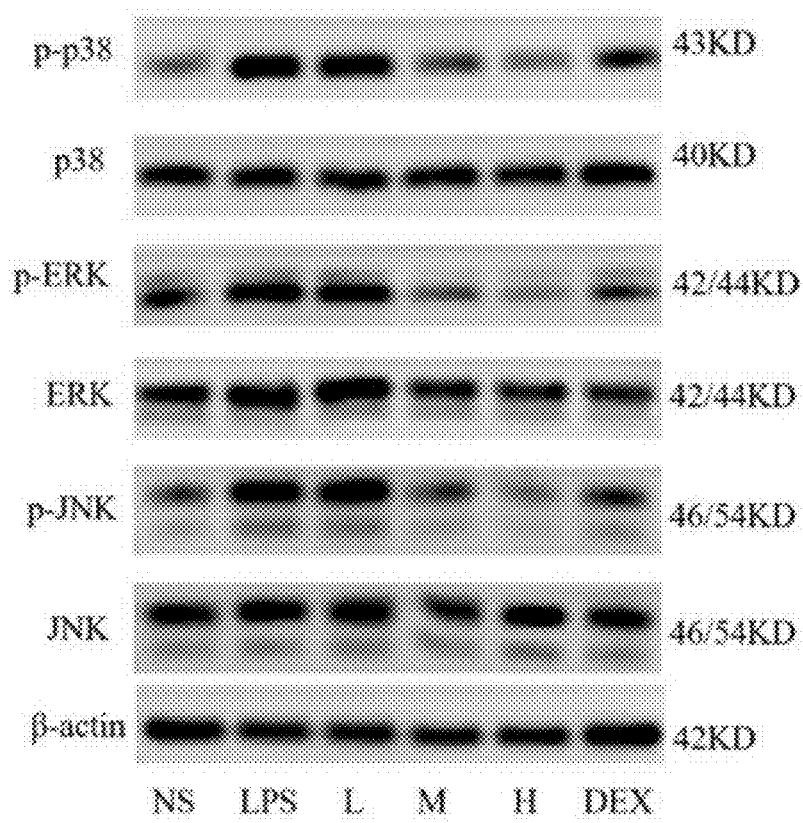

4.7 Effect of Gen-17 on Expression of NF-κB p65 Protein in Lung Tissue of ALI Mice As shown in FIGS. 9A-9B, the expression of NF-κB p65 protein in lung tissue of mice is significantly upregulated after LPS induction. Compared with the NS group, the expression of NF-κB p65 protein in lung tissue of the LPS group and the Gen-17 groups is significantly increased (P<0.001, P<0.05). Compared with the LPS group, after drug treatment, the expression of NF-κB p65 protein in lung tissue of the drug-given group decreased to different degrees, and the differences among the other groups are statistically significant (P<0.05). The results show that Gen-17 can down-regulate the expression of NF-κB p65 protein in lung tissue of ALI mice and inhibit the activation of NF-κB signaling pathway.

4.8 Effect of Gen-17 on Protein Expression of MAPK Signaling Pathway in Lung Tissue of ALI Mice As shown in FIGS. 10A-10D, the expression of p38, ERK and JNK phosphorylated proteins in lung tissue of mice induced by LPS is significantly upregulated. Compared with the NS group, the expression of p38, ERK and JNK phosphorylated proteins in lung tissue of the LPS group is significantly increased, and the difference is statistically significant (P<0.05). Compared with the LPS group, after drug treatment, the expressions of p38, ERK and JNK phosphorylated proteins in lung tissue of mice are decreased to different degrees, except for the low-dose Gen-17 group, the differences in changes among other groups are statistically significant (P<0.05). Compared with the DEX group, there is no statistically significant change in the expression of phosphorylated protein p38 in the lung tissue of the Gen-17 groups (P>0.05), while the expression of ERK and JNK phosphorylated proteins in lung tissue of the low-dose Gen-17 group is statistically significant (P<0.05). The results show that Gen-17 can down-regulate the expression of p38, ERK and JNK proteins by regulating MAPK signaling pathway.

4.9 Effect of Gen-17 on Oxidative Stress in Lung Tissue of ALI Mice

Figure 11A:
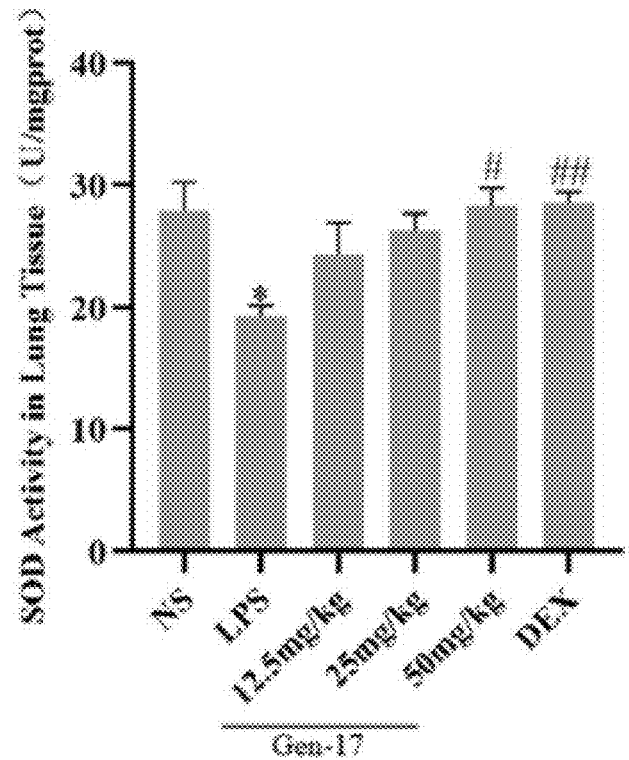
FIGS. 11A-11B illustrate contents of superoxide dismutase (SOD) and malondialdehyde (MDA) in the lung tissues ($\bar{x}\pm S$, n=6).
Figure 11B:
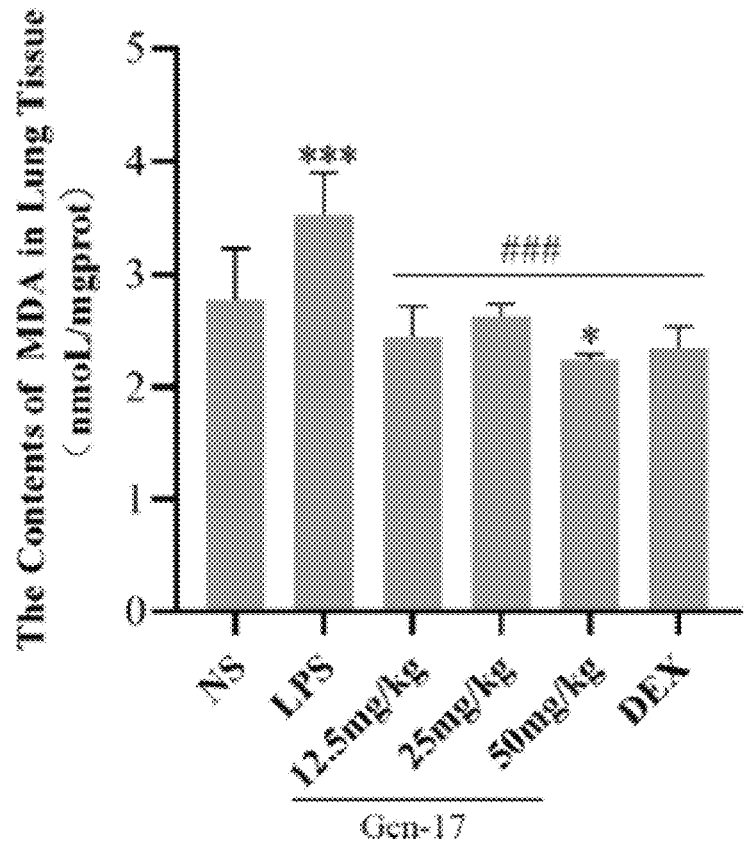

As shown in FIGS. 11A-11B, after LPS induction in mice, the activity of SOD in lung tissue is significantly reduced, and the content of MDA is significantly increased. In terms of SOD activity, compared with the NS group, the SOD activity in the LPS group is decreased (P<0.05). Compared with the LPS group, after drug treatment, the SOD activity is increased to varying degrees, but only the high-dose Gen-17 group and the DEX group show statistical significance (P<0.05). In terms of MDA content, compared with the NS group, the MDA content in the LPS group is significantly increased (P<0.001). Compared with the LPS group, after drug treatment, the MDA content in the lung tissue homogenate is significantly reduced (P<0.001). Therefore, Gen-17 can significantly increase the SOD activity in lung tissue and reduce the MDA content, thereby alleviating the degree of lung tissue injury.

Figure 12A:
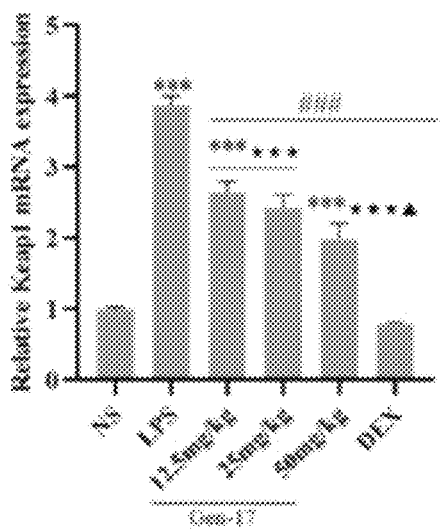
FIGS. 12A-12C illustrate effects of the Gen-17 on expressions of oxidative stress factor genes in the lung tissues of the ALI mice ($\bar{x}\pm S$, n=6).
Figure 12B:
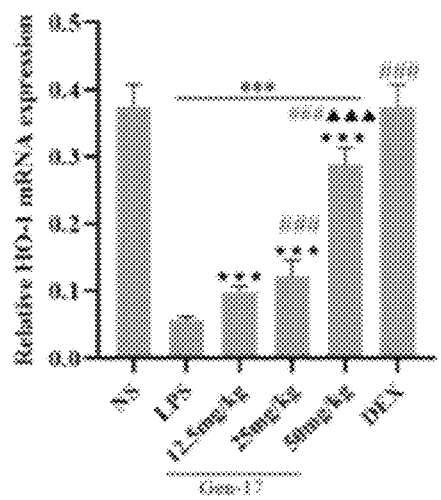
Figure 12C:
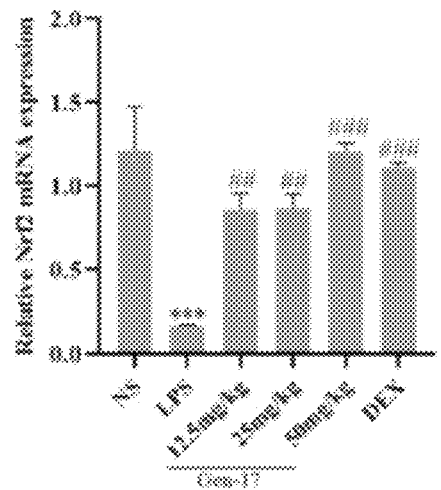
Figure 13A:
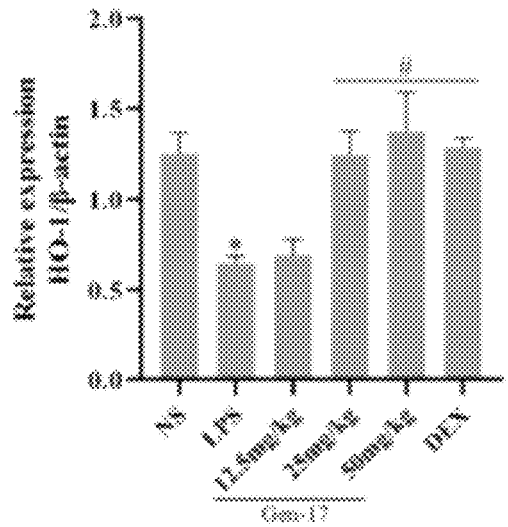
FIGS. 13A-13D illustrate expressions of Keap1, HO-1 and Nrf2 proteins in the lung tissues ($\bar{x}\pm S$, n=3).
Figure 13B:
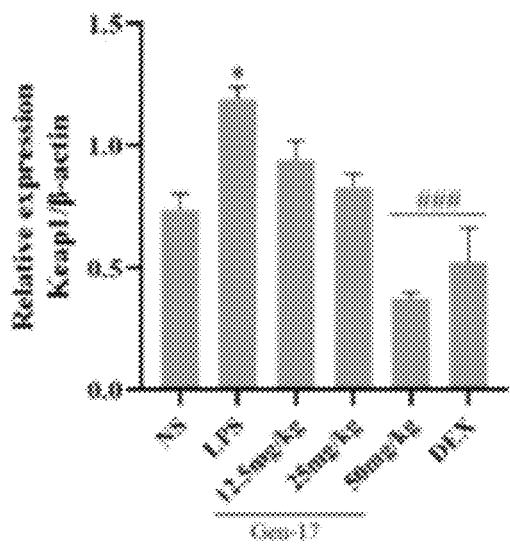
Figure 13C:
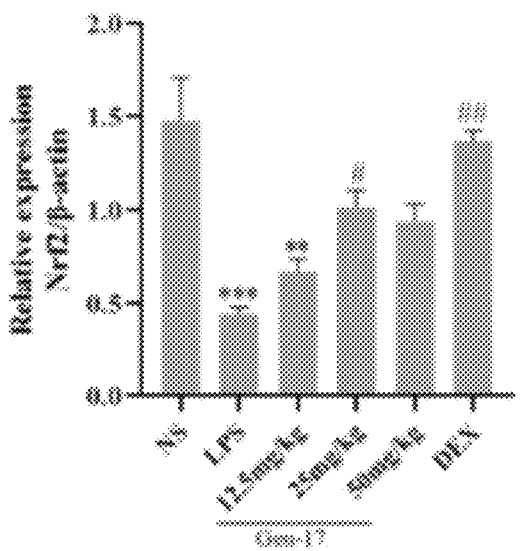
Figure 13D:
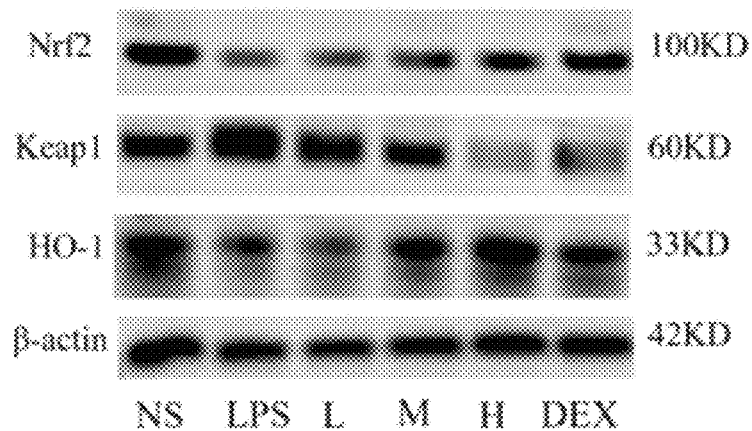

4.10 Effect of Gen-17 on Gene Expression of Oxidative Stress Factors in Lung Tissue of ALI Mice As shown in FIGS. 12A-12C, after LPS induction in mice, the expression of the Keap1 gene in lung tissue is significantly upregulated, while the expression of Nrf2 and HO-1 genes is significantly downregulated. In terms of Keap1 gene expression, compared with the NS group, the expression of Keap1 gene in the LPS group and the Gen-17 groups is significantly increased (P<0.001). Compared with the LPS group, after drug intervention, the expression of Keap1 gene is significantly decreased (P<0.001). Compared with the DEX group, the expression of Keap1 gene in the Gen-17 groups is significantly increased, and the difference is statistically significant (P<0.001). In terms of Nrf2 gene expression, compared with the NS group, the expression of Nrf2 gene in the LPS group is significantly decreased (P<0.001). After drug treatment, the expression of Nrf2 gene can be increased. In terms of HO-1 gene expression, compared with the NS group, the expression of HO-1 gene in the LPS group and the Gen-17 group is significantly decreased (P<0.001). Compared with the LPS group, after drug treatment, the expression of HO-1 gene is upregulated, except for the low-dose Gen-17 group, the differences in other groups are statistically significant (P<0.001). Compared with the DEX group, Gen-17 is statistically significant in upregulating the expression of HO-1 gene (P<0.001).

4.11 Effect of Gen-17 on Protein Expression of Keap1/Nrf2/HO-1 Signaling Pathways in Lung Tissue of ALI Mice As shown in FIGS. 13A-13D, after LPS induction in mice, the expression of Keap1 protein in lung tissue is significantly upregulated, while the expression of Nrf2 and HO-1 proteins is significantly downregulated. Compared with the NS group, the expression of Keap1 protein in the LPS group is significantly increased, while the expression of Nrf2 and HO-1 proteins is significantly decreased, and the difference is statistically significant (P<0.05). Compared with the LPS group, after drug treatment, the expression of Keap1 protein is decreased to different degrees, and only differences in the high-dose Gen-17 group and the DEX group are statistically significant (P<0.001), while there is no significant difference in the protein expression of other groups (P>0.05). The expression of Nrf2 protein is increased to different degrees, and the difference is statistically significant only in the medium-dose Gen-17 group and the DEX group (P<0.05), but there is no statistical significance in the other groups (P>0.05). The expression of HO-1 protein is increased to different degrees, except for the low-dose Gen-17 group, the differences in other groups are statistically significant (P<0.05). The results show that Gen-17 can downregulate the expression of Keap1 protein and upregulate the expression of Nrf2 and HO-1 protein by regulating Keap1/Nrf2/HO-1 signaling pathways.

ALI caused by LPS is a classical modeling method in ALI animal experiments at present. Because the structure of mice is similar to that of human body, LPS can induce mice to simulate human inflammatory response well. LPS is the main component of the cell wall of Gram-negative bacteria. As the selected inducer of inflammation model, it is the most common in the establishment of ALI animal model. It is a single infusion of LPS into the animal trachea, with high-cost performance, good reproducibility, many excellent cases and strong lung injury response. When ALI occurs, there will be inflammatory exudation, cell swelling, capillary congestion and other phenomena, which will cause the increase of lung wet weight. Because of the short time of ALI modeling, the change of mouse body weight is not obvious. Therefore, the lung index (the ratio of lung wet weight to body weight) is one of the most important indicators to reflect lung edema. In this experiment, the lung index of mice induced by LPS is significantly increased, and decreased to different degrees after intervention by Gen-17, indicating that Gen-17 can improve pulmonary edema.

The occurrence of ALI will be accompanied by the infiltration of inflammatory cells such as macrophages, neutrophils and lymphocytes, and the release of inflammatory cytokines will lead to an inflammatory cascade reaction, which will destroy the integrity of vascular endothelium and alveolar epithelial cells and lung tissue injury. In this experiment, after LPS induction, the total cell count and total protein concentration in BALF are increased significantly, HE staining of lung tissue shows a large number of inflammatory cell infiltrations, thickening of alveolar walls, and obvious pulmonary alveolar inflammation. After administration of Gen-17, the exudation of inflammatory cells and proteins is reduced, and the lung tissue inflammation is alleviated to varying degrees, indicating that Gen-17 can improve the alveolitis and lung injury process in ALI mice.

Inflammation is an important inducement of ALI, and many reports point out that the molecular mechanism of ALI is related to the excessive release of inflammatory cytokines such as IL-1$\beta$, TNF-$\alpha$ and IL-6. NF-$\kappa$B/MAPK is the most typical proinflammatory signaling pathway, which can promote the release of inflammatory genes and trigger the development of ALI. Therefore, timely control of disease progression before the onset of ALI or early elimination of inflammation in ALI can effectively improve the condition, improve the cure rate of patients and reduce the damage suffered before the disease is solved. In this study, according to the results of RT-PCR and ELISA, the mRNA transcription levels and secretion amounts of IL-1$\beta$, TNF-$\alpha$ and IL-6 are increased after LPS treatment and decreased to some extent after Gen-17 intervention. When a large number of inflammatory cells are released, the NF-κB signaling pathway is activated, activating the downstream signaling molecule p65 in the NF-κB pathway, thereby regulating the occurrence of ALI. Besides. MAPK signaling pathway plays a crucial role in the occurrence and development of inflammation, which belongs to the classic inflammatory pathway. The phosphorylation of downstream proteins p38, ERK, and JNK in this signaling pathway leads to abnormally high levels of inflammatory inflammatory cytokines such as IL-1β, TNF-α and IL-6, and the increase in the concentration of various inflammatory cytokines, and further elevation of these inflammatory cytokine concentrations promotes the cascade reaction of MAPK family proteins, leading to the occurrence of a cytokine storm. Zhang et al. (Zhang M, Zhang J, Zhu QM, Zhao WY, Lv X, Yi J, Huo XK, Wang MJ, Sun CP. Inula japonica ameliorated the inflammation and oxidative stress in LPS-induced acute lung injury through the MAPK/NF-κB and Keap1/Nrf2 signalling pathways. J Pharm Pharmacol. 2023; 75 (2): 287-299.) found that in the ALI animal model, the release of inflammatory cells is reduced by specifically inhibiting the transmission of NF-κB and MAPK signaling pathways to the cascade, which is consistent with the results reported in the above literature. In addition, iNOS is an NO synthase, and its expression directly determines the secretion of NO, serving as an important indicator for detecting inflammatory response. The regulation of iNOS is considered as an important tool to treat inflammatory diseases. In this experiment, after LPS induction, the mRNA content of iNOS in lung tissue is increased, suggesting that successful modeling and the presence of inflammation. The mRNA content of IκB-α and IKKα/β in lung tissue is increased, and the expression of p65 protein is significantly upregulated, suggesting activation of the NF-κB signaling pathway. The expression of p38, ERK1/2 and JNK phosphorylated protein in lung tissue is significantly increased, suggesting activation of the MAPK signaling pathway. After intervention with Gen-17, the mRNA contents of IκB-α and IKKα/B are decreased, and the protein expressions of p65, p38, ERK1/2 and JNK are decreased, suggesting that Gen-17 can alleviate the inflammatory reaction by inhibiting NF-κB and MAPK signaling pathways, thus inhibiting the occurrence of ALI. The above experimental results are consistent with in vitro experiments.

Oxidative stress is due to the excessive production of reactive oxygen species in the body or the dysfunction of scavenging reactive oxygen species, which eventually leads to the abnormal increase of reactive oxygen species in the tissues or cells of the body, thus leading to the break of the balance between oxidation and antioxidation in the body, making the balance tend to an oxidation state, leading to the infiltration of a large number of inflammatory cells in the tissues and the secretion of a large number of proteases, thus producing accumulated oxidation intermediates. The existing literature shows that oxidative stress can be used as the pathological basis of all kinds of ALI and plays an important role in different stages of ALI. MDA is a sensitive marker to break lipid peroxidation in the equilibrium state of oxidative stress, while CAT and SOD, as antioxidant enzymes for scavenging free radicals in the body, are two important indexes to evaluate the body antioxidation. In this experiment, LPS induces ALI in mice, which led to a significant increase in the detection results of MDA. On the contrary, the activity of SOD is decreased significantly, which proves that the balance of oxidative stress in the body is broken after LPS stimulation. After the intervention of Gen-17, the content of MDA in lung tissue decreased, while the activity of SOD increased, which is consistent with the results in vitro. In addition, Nrf2-antioxidant response element (ARE) pathway is the inherent mechanism of antioxidant defense, and Nrf2 participates in the anti-inflammatory process by participating in the recruitment of inflammatory cells and regulating the expression of ARE gene. Keap1 is a Cullin3 (Cul3)-based E3 ubiquitin ligase adaptor protein, which can strictly regulate the activity of Nrf2. Under normal physiological conditions, Keap1 selectively targets Nrf2, leading to ubiquitin-dependent proteasome degradation. When oxidative stress occurs, Keap1 inactivation can inhibit the ubiquitination of Nrf2, which eventually leads to the accumulation of newly synthesized Nrf2 and its activation. Studies have revealed that Nrf2 plays an important role in the adaptive response to oxidative stress and other kinds of stress in cells, and may be a prospective target for controlling oxidative stress in ALI. Therefore, the transcription level and protein expression of Keap1, Nrf2 and HO-1 are detected by PT-PCR and WB. The results show that after LPS induced ALI in mice, the mRNA content and protein expression of Keap1 in lung tissue are increased, while the mRNA content and protein expression levels of Nrf2 and HO-1 are decreased. After intervention by Gen-17, the mRNA content and protein expression of KeaP1 are significantly reduced, and the mRNA content and protein expression of Nrf2 and HO-1 are increased. This shows that Gen-17 plays an antioxidant role through Keap/Nrf2/HO-1 signal, thus inhibiting the occurrence and development of ALI. The disclosure can provide some experimental basis for the application of Gen-17 in the prevention and treatment of acute severe pneumonia.

Apparently, for those skilled in the art, the disclosure is not limited to the details of the above-mentioned exemplary embodiments, and can be realized in other specific forms without departing from the spirit or basic characteristics of the disclosure. Therefore, the embodiments should be considered in all aspects as illustrative and not restrictive, and the scope of the disclosure is defined by the appended claims rather than the above description. Therefore, all changes which come within the meaning and range of equivalency of the appended claims are intended to be embraced therein.

What is claimed is:
1. A method for treating acute severe pneumonia, comprising:
administering to a subject a therapeutically effective amount of a compound Gen-17 having the following chemical structure:

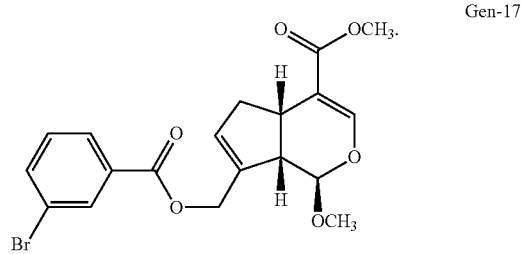 [SMILES: COC(=O)C1=CO[C@@H](OC)[C@@H]2C(COC(=O)c3cccc(Br)c3)=CC[C@H]12]

2. The method as claimed in claim 1, wherein the therapeutically effective amount is in a range of 12.5 milligrams per kilogram (mg/kg) to 50 mg/kg of body weight per day.
3. The method as claimed in claim 1, wherein the compound Gen-17 is used to inhibit nuclear factor kappa B (NF-κB) and mitogen-activated protein kinase (MAPK) signaling pathways in lung tissue of the subject.

4. The method as claimed in claim 1, wherein the compound Gen-17 is used to activate Kelch-like ECH-associated protein 1 (Keap1)/nuclear factor erythroid 2-related factor 2 (Nrf2)/heme Oxygenase-1 (HO-1) signaling pathways in lung tissue of the subject.

* * * * *